United States Patent [19]

Tanaka et al.

[11] 4,349,362
[45] Sep. 14, 1982

[54] MULTI-STAGE MOVING BED TYPE ADSORPTION DEVICE

[75] Inventors: Itsuo Tanaka, Hiratsuka; Hiromi Tanaka, Abiko, both of Japan

[73] Assignee: Sumitomo Heavy Industries, Ltd., Tokyo, Japan

[21] Appl. No.: 186,067

[22] Filed: Sep. 11, 1980

[30] Foreign Application Priority Data

Sep. 18, 1979 [JP] Japan .................................. 54-118820

[51] Int. Cl.³ ............................................. B01D 53/06
[52] U.S. Cl. ........................................ 55/390; 55/474; 55/484; 422/171; 422/191; 422/197; 422/239
[58] Field of Search ................. 55/390, 474, 479, 484, 55/485, 518, 519; 422/177, 178, 191, 197, 216, 238, 239, 171

[56] References Cited

U.S. PATENT DOCUMENTS 2,604,187 7/1952 Dorfan .................................. 55/474
3,716,969 2/1973 Maeda .................................. 55/390

FOREIGN PATENT DOCUMENTS 533037 8/1931 Fed. Rep. of Germany ........ 55/390
54-5872 1/1979 Japan .................................. 55/390
55-5751 1/1980 Japan .................................. 55/390
55-129127 10/1980 Japan .................................. 55/485

Primary Examiner—David L. Lacey

Attorney, Agent, or Firm—Blanchard, Flynn, Thiel, Boutell & Tanis

[57] ABSTRACT

A multi-stage, moving bed-type, adsorption device which comprises a unit made of an adsorbent particles-filled chamber which is defined by two fore and rear louvers, the distance therebetween being larger downwardly, two fore and rear lower walls extending downwardly from the lower ends of the fore and rear louvers, respectively, the distance therebetween being narrower downwardly, and two right and left side walls, an inverted V-shaped rectifying body extending horizontally from the right side wall to the left side wall and a rectifying plate extending vertically downwardly from the top of said rectifying body, said rectifying body and said rectifying plate being located in the lower region of the said chamber, a plurality of said units being placed one upon another and communicated with each other by a coupling means consisting of two vertical fore and rear walls and side walls, the distance between the louvers of the lower unit being larger than that of the upper unit adjacent thereto; a gas-circulating vessel containing said plurality of said units therein; an adsorbent particle inlet port provided at the top of the uppermost unit; and an adsorbent particle discharging means provided at the bottom of the lowest unit, wherein the adsorbent particles flowing down within each unit are brought into contact with the gas passing through the gas-circulating vessel in a cross current manner.

3 Claims, 4 Drawing Figures

MULTI-STAGE MOVING BED TYPE ADSORPTION DEVICE

BACKGROUND OF THE INVENTION

This invention relates to an improved cross current, moving bed-type, adsorption device for use in removing a specific component contained in a gas, such as the sulfur oxide contained in an exhaust gas.

In the case where a large volume of gas is treated with a solid adsorbent it is known that the cross current, moving bed-type, adsorption device is advantageous in the points of equipment area, controllability of the flow rate of the adsorbent and gas load, said device being constructed so that the gas flow is brought into contact with the adsorbent particle moving bed in a cross current manner. U.S. Pat. No. 3,716,969 issued to Isamu Maeda describes that a continuous moving layer adsorption device employed in an exhaust gas desulfurization system is made of an adsorption vessel as the main body filled with activated carbon and a rectifying device included therein, the adsorption vessel main body comprising a side wall provided with a number of louvers and located at the gas-introducing side of the vessel, another side wall having delivery holes located at the gas-exhausting side of the vessel, the distance between the gas-introducing side wall and the gas-exhausting side wall being larger toward the downward portion of the vessel, a hopper-like portion provided adjacently below the two side walls, and an elongated port provided at the bottom of the hopper-like portion for delivering the activated carbon; and the rectifying device comprising a rectifying body placed in the hopper-like portion and a rectifying plate extended downwardly from the rectifying body. According to this adsorption device, the center-dropping phenomenon and the suspension phenomenon of adsorbent particles can be prevented, said phenomena being apt to take place in the moving bed of the box-type moving bed adsorption device, thereby ensuring the uniform downward flow of adsorbent particles. In this connection, the center-dropping phenomenon is defined to be a phenomenon wherein the centrally located portion in the layers of the adsorbent particles just above the discharging port fall down prematurely, and the suspension phenomenon is defined to be a phenomenon wherein the adsorbent particles filled inside of the adsorption vessel is suspended in a crust-like configuration caused by a lateral compressive force, both of which are detailed in U.S. Pat. No. 3,716,969.

However, even such a device involves many troubles in order to achieve the uniform gas distribution. The reason is that in order to increase the gas treating capacity of the device it is inevitably necessary to increase the height of the adsorbent filled layer and consequently there is created a conspicuous difference in layer pressure between the particles located at the upper part and those located at the lower part thereof since the adsorbent filled bed is made to have a divergent structure, whereby the amount of the exhaust gas passing through the upper part is markedly increased. In addition, the increase in the height of the adsorbent particle layer brings about troubles such that the particles located at the bottom of the layer are liable to crush and wear by their own pressure and further attention must be paid to a probability that the uniform downward flow of particles is disturbed, although it is caused partly because the width of the bed is increased as a result of employing a large-scale equipment. Accordingly, it is natural that the device of U.S. Pat. No. 3,716,969 as it stands has a limitation in its capacity.

Another problem involved in the cross current, moving bed-type, adsorption device consists in that it is inferior in the coefficiency of utilization of adsorbent as compared with the counter current moving bed type device.

FIG. 1 is a graph illustrating one example of the changes in the amount of $SO_2$ adsorbed on activated carbon with the passing of time measured by hanging a basket packed with the activated carbon in a $SO_2$-containing gas. As illustrated therein, the changes in the amount of $SO_2$ adsorbed on the activated carbon with the passing of time can be divided into Zone I wherein the adsorbed amount increases in a linear, steep gradient, Zone II where the rate of increase of the adsorbed amount slows down and Zone III where the adsorbed amount reaches the saturation amount ultimately while increasing in a somewhat linear gradient. In order to maintain the effective utilization of the adsorbent, namely activated carbon, at a high level, it is preferable that the activated carbon should be utilized before and behind the boundary line between Zone II and Zone III rather than in Zone I. However, the relation between the residence time of activated carbon and the SOx concentration of the gas at the outlet port of the moving bed, as shown in FIG. 2, can be obtained from the practical treatment of the SOx-containing gas by means of a conventional cross current, moving bed, adsorption device using activated carbon as an adsorbent, which indicates a tendency that the SOx concentration of the gas at the outlet port decreases as the residence time of the activated carbon is shortened and increases as the residence time is prolonged. It may be summarized that, in the case of said conventional cross current, moving bed, adsorption device, the activated carbon must be used in the zone where the adsorption rate does not slow down, that is, Zone I illustrated in FIG. 1 in order to maintain the desulfurization rate at a high level, because a prolonged residence time of the activated carbon slows down the adsorption rate of SOx onto the activated carbon, thereby causing the SOx concentration of the gas at the outlet port to increase. However, this is not desirable because the utilization of the activated carbon can not performed effectively.

In order to maintain the desulfurization rate at a high level without spoiling the effective utilization of the activated carbon, there is the necessity of providing the cross current, moving bed with a means capable of compensating for the slowing down of the adsorption rate when the residence time of the activated carbon is prolonged. Specifically it is necessary to design the cross current, moving bed so that the space velocity of the gas in the lower region of the cross current, moving bed may be smaller than that in the upper region thereof.

In the continuous moving layer-type, adsorption device disclosed in U.S. Pat. No. 3,716,969, wherein the moving bed has divergent structure, the space velocity of the gas passing through the moving bed in a cross current slows down as the bottom of the moving bed is approached. Accordingly, the cross current, moving bed of this type may be said to compensate for the aforesaid slowing down of the adsorption rate in a way. However, this cross current, moving bed is defective in that it is unsuitable for the purpose of treating a large capacity of gas because the layer height (H in FIG. 2) can not be increased without elevating the pressure in masses of adsorbent particles per se.

Furthermore, Japanese Patent Publication No. 46790/1978 teaches a moving bed in which the flow rate of gas in both the upper and lower regions of the moving bed is controlled by the provision of a baffle plate, thereby lowering the space velocity of the gas passing through the lower region thereof, but this moving bed also has the problem that when the layer height is increased, the pressure in masses of adsorbent particles is elevated to an excessive degree.

SUMMARY OF THE INVENTION

This invention has solved the above mentioned various problems by connecting said communicating a plurality of adsorption chambers constructed as taught by U.S. Pat. No. 3,716,969 in series and enlarging the capacity of the lower adsorption chamber compared to that of the upper adsorption chamber adjacent thereto.

In more detail, this invention provides the multi-stage, moving bed-type, adsorption device which comprises a unit made of a chamber filled with adsorbent particles, said chamber is defined by two fore and rear louvers, the distance therebetween being larger downwardly, two fore and rear lower walls extending downwardly from the lower end of the fore and rear louvers, respectively, the distance between said louver walls beingnarrower downwardly, and two right and left side walls, an inverted V-shaped rectifying body extending horizontally from the right side wall to the left side wall and a rectifying plate extending vertically downwardly from said rectifying body, the rectifying body and the rectifying plate being located in the lower region of the said chamber, a plurality of said units being placed one upon another and communicated with each other by coupling means consisting of two vertical fore and rear walls and side walls, the distance between the louvers of the lower unit being larger than that of the upper unit adjacent thereto; a gas-circulating vessel container a plurality of said units therein; an adsorbent particle inlet port provided at the top of the uppermost unit; and an adsorbent discharging means provided at the bottom of the lowest unit, wherein the adsorbent flowing down within each unit while forming a moving bed is brought into contact with the gas passing through the gas-circulating vessel in a cross current manner.

According to this device, it can be ensured that the utilization of the adsorbent, such as activated carbon or the like, is achieved effectively and the percentage of adsorption removal is maintainable at a high level and further there is no fear that the pressure in masses of adsorbent particles per se is elevated excessively even when a large-sized equipment is utilized for treating a large volume of gas.

DETAILED DESCRIPTION OF THE INVENTION

Figure 1:
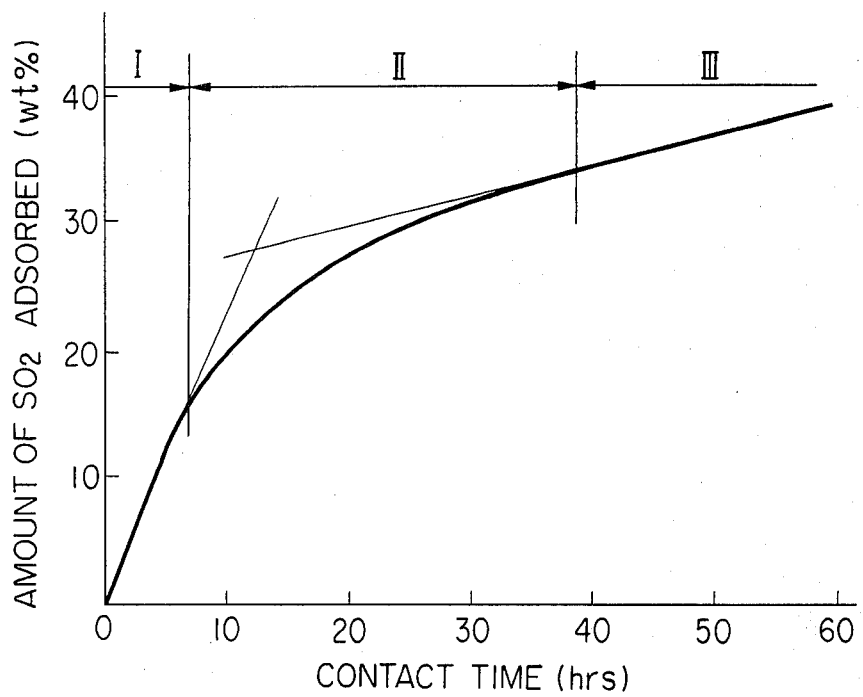
FIG. 1 is a graph illustrating the relation between the amount of $SO_2$ adsorbed and the contact time.
Figure 2:
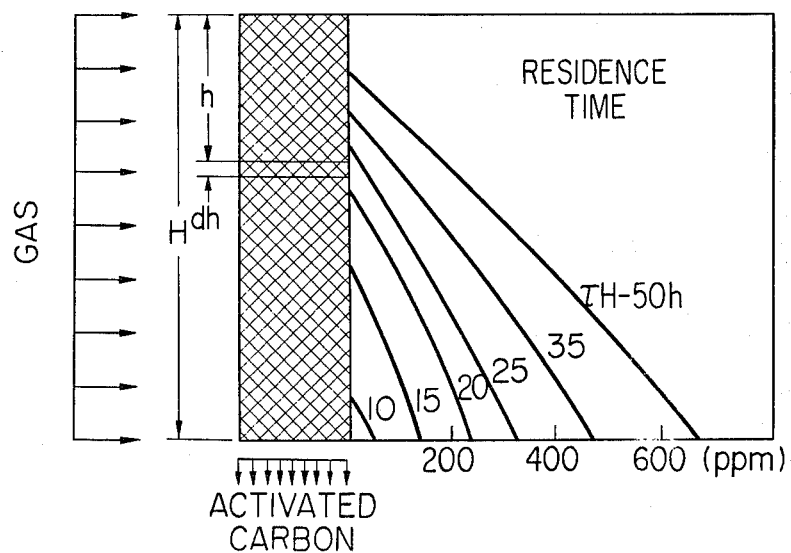
FIG. 2 is a graph illustrating the relation between the activated carbon residence time and the SOx concentration of the gas at the outlet port of the moving bed in the conventional cross current moving bed.
Figure 3:
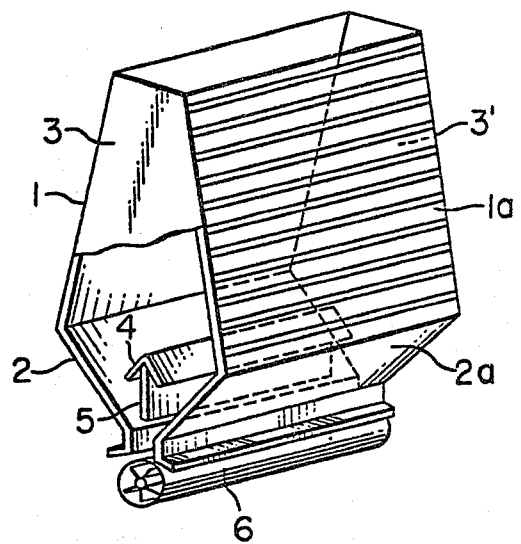
FIG. 3 is a perspective view illustrating the construction of the adsorption chamber unit used in this invention.

In the perspective view illustrated in FIG. 3, an adsorption chamber unit to be filled with adsorbent is defined by two fore and rear louvers 1 and 1a, the distance therebetween being larger downwardly, two fore and rear lower walls 2 and 2a extending downwardly from the lower end of the fore and rear louvers, respectively, the distance therebetween being narrower downwardly, and two right and left side walls 3 and 3'. An inverted, V-shaped in crosssection, rectifying body 4 extends horizontally from the right side wall to the left side wall and a rectifying plate 5 extends vertically downwardly from the top of said rectifying body 4. The rectifying body 4 and the rectifying plate 5 are located in the lower region of the said chamber. The adsorbent flows down within the adsorption chamber while forming a moving bed. The gas enters into the adsorption chamber through the gaps of the louver 1, then contacts with the adsorbent moving bed therein and thereafter leaves the adsorption chamber through the gaps of the louver 1a. In the multi-stage-type, cross current, moving bed, adsorption device according to this invention, wherein a plurality of the thus constructed adsorption chamber units are placed one upon another, generally speaking, it is desirable that the height of each unit should be in the range of from 2 to 6 m, preferably in the range of from 4 to 5 m, taking into consideration the pressure in the masses of adsorbent.

It is to be noted that in FIG. 3, numeral 6 designates a roll feeder as an example of the adsorbent-discharging means and that this discharging means is installed only in the lowest unit but not in the other units.

Figure 4:
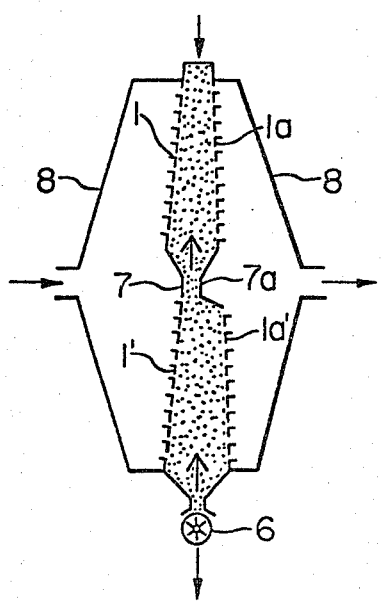
FIG. 4 is a sectional side elevation of one embodiment of the multi-stage moving bed type adsorption device of this invention.

One embodiment of the multi-stage, moving bed-type, adsorption device according to this invention wherein two adsorption chamber unit as shown in FIG. 3 is arranged one above the other, is illustrated in FIG. 4. In FIG. 4, the upper stage unit and the lower stage unit are communicated with each other by a coupling means consisting of two fore and rear vertical walls 7 and 7a and right and left side walls which are extensions of walls 3 and 3', whereby the adsorbent can successfully be transferred from the upper stage unit to the lower stage unit uniformly. Said two upper and lower stage units are contained within a gas-circulating vessel 8. The top of the upper stage unit opens as an adsorbent inlet port and the bottom of the lower stage unit is provided with discharging means 6. As shown in FIG. 4, the distance between the two fore and rear louvers of each unit is larger toward the downward portion of the unit, but when a comparison is made at corresponding vertical locations in the respective units, the distance between the lower stage louvers 1' and 1a' is larger than that between the upper stage louvers 1 and 1a. This relation is perceivable likewise in the case where three stages or more units are arranged in a vertical array. That is, when comparing any two units connected in series, the distance between the lower stage side louvers is always larger than that between the upper stage side louvers. In this case, it is suitable that the distance between the lower stage side louvers is in the range of from about 1.1 to 1.5, preferably from about 1.2 to 1.3 times as large as the distance between the upper stage side louvers.

Although the adsorption chamber units are arranged vertically in two stages in the case of the embodiment illustrated in FIG. 4, it is to be noted that as a matter of course it is also possible for the present device to vertically arrange units in three stages or more depending on the volume of gas to be treated, the strength of adsorbent and so forth, wherein it is preferable that each unit should take a similar shape.

As is evident from the above, the multi-stage-type, cross current, moving bed, adsorption device according to this invention, which comprises a plurality of units vertically arranged in series, is capable of treating a large volume of gas with a reduced equipment area. Further, since each unit is made to have a divergent structure including the rectifying means and is communicated respectively by means of a coupling means consisting of two vertical fore and rear walls and right and left side walls, the adsorbent is permitted to flow down within each unit uniformly. Still further, this invention avoid the trouble that the pressure in masses of the adsorbent is excessive because it is unnecessary in this invention to increase the height of each unit, namely, the height of the adsorbent layer in each unit, even when a large volume of gas is treated thereby. Still further, this invention, wherein each unit is made to have a divergent structure, can lower the space velocity of the gas passing through the lower region of each unit. In addition thereto, when the distance between the louvers in each unit is enlarged from the upper stage side toward the lower stage side, the gas is liable to flow through the upper stage side unit rather than the lower stage side unit. Accordingly, the space velocity of the gas passing through the lower region of the device as a whole can be lowered, whereby there is no fear that the adsorption removal performance of the adsorbent is not deteriorated and as a matter of course the utilization of the adsorbent can be improved highly.

We claim:

1. A multi-stage, moving bed-type, adsorption apparatus, comprising:
a gas-circulating vessel having a gas inlet and a gas outlet for gas to be treated;
a plurality of adsorption chamber units, said adsorption chamber units being located inside said vessel between said gas inlet and said gas outlet, and filled with adsorbent particles and being arranged in vertical alignment one above the other so that adsorbent particles can flow downwardly through said units in series; each of said adsorption chamber units comprising opposed, upwardly extending, horizontally spaced-apart, front and rear, upper walls, said upper walls comprising louvers so that gas can be fed through the louvers in one of said upper walls and can be discharged through the louvers in the other of said upper walls, the upper ends of said upper walls being horizontally spaced from each other to define an inlet for said adsorbent particles, said upper walls diverging with respect to each other in the downward direction; opposed, horizontally spaced-apart, front and rear, lower walls extending downwardly from the lower ends of said front upper wall and said rear upper wall, respectively, said lower walls converging toward each other in the downward direction with the lower ends of said lower walls being horizontally spaced from each other to define an outlet for adsorbent particles; a pair of side walls extending between said front and rear, upper and lower walls at the opposite ends thereof, respectively, for closing the space therebetween so that said upper, lower and side walls define a chamber for containing said adsorbent particles; a horizontal rectifying body which is of inverted V-shape in cross section and a vertical rectifying plate extending downwardly from the apex of said rectifying body, said rectifying body and said rectifying plate being centrally located in the lower portion of said chamber between said front and rear lower walls and extending horizontally between said side walls; a coupling passage extending downwardly from the adsorbent outlet of each of said adsorption chamber units, except the lowermost one thereof, to the adsorbent inlet of the adjacent adsorption chamber unit located therebelow, each said coupling passage being located directly vertically below the rectifying body of the adsorption chamber unit disposed thereabove, each said coupling passage being defined by opposed, horizontally spaced-apart, front and rear, vertical walls which extend downwardly from the lower ends of the front and rear lower walls of the upper adsorption chamber unit to the upper ends of the front and rear upper walls of the adjacent lower adsorption chamber unit so that adsorbent particles leaving the adsorbent outlet of the upper adsorption chamber unit flow through said coupling passage into the adsorbent inlet of the adjacent lower adsorption chamber unit; the horizontal distance between said upper walls of each of said adsorption chamber units, except the uppermost adsorption chamber unit, being larger than the horizontal distance between said upper walls of the adjacent upper adsorption chamber unit at corresponding vertical locations in said units, so that the space velocity of the gas that flows through a lower adsorption chamber unit is lower than the space velocity of the gas that flows through the adjacent upper adsorption chamber unit; and an adsorbent particle discharging means provided at the adsorbent outlet of the lowermost adsorption chamber unit.

2. The multi-stage, moving bed-type, adsorption apparatus as claimed in claim 1 in which the horizontal distance between said upper walls of each of said adsorption chamber units is in the range of from about 1.1 to 1.5 times as large as the distance between said upper walls of the adjacent upper adsorption chamber unit.

3. The multi-stage, moving bed-type, adsorption apparatus as claimed in claim 1 in which the horizontal distance between the lower ends of said upper walls of a lower adsorption chamber unit is larger than the horizontal distance between the lower ends of said upper walls of the adjacent upper adsorption chamber unit.

* * * * *